United States Patent
Takahashi

(10) Patent No.: US 7,643,171 B2
(45) Date of Patent: Jan. 5, 2010

(54) PRINT CONTROLLER, PRINTER, AND PROGRAM

(75) Inventor: Osamu Takahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1011 days.

(21) Appl. No.: 10/813,271

(22) Filed: Mar. 31, 2004

(65) Prior Publication Data

US 2004/0252314 A1 Dec. 16, 2004

(30) Foreign Application Priority Data

Mar. 31, 2003 (JP) ............................. 2003-093547

(51) Int. Cl.
*G06F 15/00* (2006.01)
*B41J 11/44* (2006.01)

(52) U.S. Cl. ........................................ 358/1.18; 400/76

(58) Field of Classification Search ................ 358/1.18, 358/1.15, 1.13, 1.14, 1.16, 406, 452; 400/76, 400/613; 707/1, 3, 5, 10, 27, 35, 104.1; 709/228, 709/245, 288; 271/110, 121, 288, 298; 156/216, 156/247, 277; 399/81; 719/327

See application file for complete search history.

(56) References Cited

U.S. PATENT DOCUMENTS

| | | | | |
|---|---|---|---|---|
| 5,123,676 | A * | 6/1992 | Donnelly et al. | 283/37 |
| 6,301,013 | B1 * | 10/2001 | Momose et al. | 358/1.15 |
| 6,799,005 | B2 * | 9/2004 | Bodine et al. | 399/82 |
| 2003/0184806 | A1 * | 10/2003 | Nara et al. | 358/1.18 |

FOREIGN PATENT DOCUMENTS

| | | |
|---|---|---|
| JP | A 58-49291 | 3/1983 |
| JP | A 7-123228 | 5/1995 |
| JP | A-11-240226 | 9/1999 |
| JP | A 2001-88407 | 4/2001 |
| JP | A-2002-311753 | 10/2002 |
| JP | A-2003-25679 | 1/2003 |

* cited by examiner

*Primary Examiner*—Saeid Ebrahimi Dehkordy
(74) *Attorney, Agent, or Firm*—Oliff & Berridge, PLC

(57) ABSTRACT

A print controller for controlling an image print unit to print an index image on a recording medium to be used for separation when a printed record medium is recycled, includes: an output unit that outputs image data representing an image to be printed on the record medium to the image print unit; and an index unit that determines the index image to be printed on the record medium together with the image by the image print unit based on a printing condition.

26 Claims, 14 Drawing Sheets

EXAMPLE OF PRINT PAPER MATERIAL

FIG. 5

PROPERTIES OF PRINTER ***

[ BASIC SETTING ] [ OPTION SETTING 1 ] [ OPTION SETTING 2 ] [ SUPPORT ]

♻ RECYCLE CLASSIFICATION INFORMATION INDICATION
● YES    ○ NO

SETTING CLASSIFICATION CONDITION ACCORDING TO PRINT AREA RATIO

MONOCHROME (SINGLE COLOR OF K): 0% | 20% | 40% | 100%
- NO. 1 | NO. 2 | NO. 3
- NO. 2 | NO. 3

COLOR (TOTAL OF CMY): 0% | 10% | 100%

SETTING CLASSIFICATION CONDITION ACCORDING TO PAPER TYPE

| | PAPER MATERIAL | PAPER SIZE | INDICATION NAME |
|---|---|---|---|
| GROUP NO. 1: | ONLY PLAIN PAPER ▼ | POSTCARD OR LARGER ▼ | GOOD QUALITY PAPER |
| GROUP NO. 2: | ONLY PLAIN PAPER ▼ | POSTCARD OR LARGER ▼ | NEWSPAPER |
| GROUP NO. 3: | NO SPECIFICATION ▼ | NO SPECIFICATION ▼ | MISCELLANEOUS PAPER |
| GROUP NO. 4: | — ▼ | — ▼ | — |

SETTING RECYCLE CLASSIFICATION INFORMATION INDICATION METHOD

INDICATION POSITION: [ BOTTOM CENTER OF PRINT FACE ▼ ]

FONT: [ GOTHIC ▼ ] [ 10 pt ▼ ]

ADDITIONAL INFORMATION:
☐ PRINT AREA RATIO (%) INDICATION
☐ PAPER MATERIAL/SIZE INFORMATION INDICATION
☐ BAR CODE INDICATION

PAPER TYPE: PLAIN PAPER
A4 PORTRAIT

[ SAVE USER DEFINITION ]    [ READ USER DEFINITION ]

[ OK ]    [ CANCEL ]    [ HELP ]

SURFACE IN SINGLE-SIDED PRINT

FIG. 8

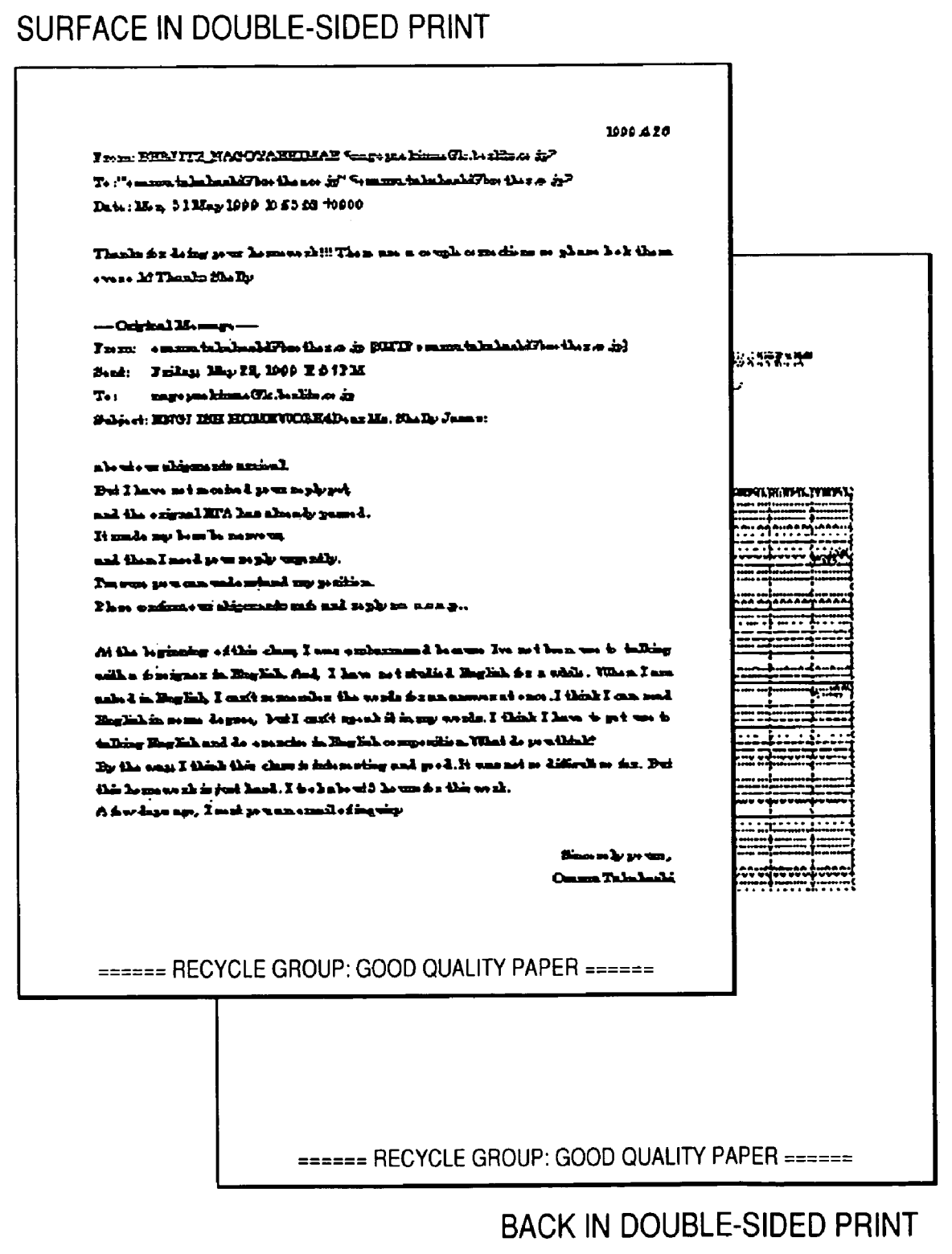

SURFACE IN DOUBLE-SIDED PRINT

====== RECYCLE GROUP: GOOD QUALITY PAPER ======

====== RECYCLE GROUP: GOOD QUALITY PAPER ======

BACK IN DOUBLE-SIDED PRINT

SURFACE IN SINGLE-SIDED PRINT

GOOD QUALITY PAPER (PRINT RATIO K: 6%, CMY: 2%)

MISCELLANEOUS PAPER (SPECIAL COATED PAPER A4)

GOOD QUALITY PAPER

PRINT CONTROLLER, PRINTER, AND PROGRAM

BACKGROUND OF THE INVENTION

1. Field of the Invention

The present invention relates to an art for printing an image on a record medium.

2. Background Art

Hitherto, a printer for printing an image to be printed on paper as a record medium has been known.

In some printers, the ratio between the number of characters printed on paper and the maximum number of characters that can be printed on paper is calculated as the print ratio for display on a display section for the purpose of furthering the effective use of paper. (For example, refer to JP-A-58-49291 (p.1-p.4))

SUMMARY OF THE INVENTION

By the way, in recent years, importance has been placed on the recycling of paper as global environmental issues are becoming increasing serious with each passing year.

However, under present circumstances, in waste paper collection traders for recycling paper, a large amount of waste paper collected from enterprises and general consumers is separated manually. That is, waste paper is classified in different manners based on the print substance, such as paper with large or small margin, print paper in a single color of black or in colors, and is also classified in different manners based on the paper material, such as plain paper or special coated paper. Therefore, the worker must manually separate waste paper while determining which group the waste paper falls under, and there is a problem of low work efficiency.

An art for making it possible to make record medium separation work efficient is provided herein.

According to one aspect of the invention, a print controller for controlling an image print unit to print an index image on a recording medium to be used for separation when a printed record medium is recycled, includes: an output unit that outputs image data representing an image to be printed on the record medium to the image print unit; and an index unit that decides an index image to be printed on the record medium together with the image by the image print unit based on a printing condition.

According to another aspect of the invention, an image forming apparatus includes: an image print unit that prints an image on the record medium; a printer controller; wherein the printer controller includes an output unit that outputs image data representing the image to the image print unit, and an index unit that decides an index image to be used as an index of separation for recycling the record medium, the index image to be printed on the record medium by the image print unit.

According to another aspect of the invention, a program product causes a computer to function as: print ratio calculation means for calculating the occupation ratio of an image to be printed on a record medium to the record medium as a print ratio; and index print means for determining an index image used as an index of separation for recycling the record medium based on the print ratio calculated by the print ratio calculation means and performing processing to print the index image on the record medium.

According to another aspect of the invention, a program product causes a computer to function as: medium determination means for determining the type of record medium on which an image to be printed is printed; and index print means for determining an index image used as an index of separation for recycling the record medium based on the type of record medium determined by the medium determination means and performing processing to print the index image on the record medium.

According to another aspect of the invention, an automatic separation apparatus, includes: a paper receiving unit that receives a recording medium; a reading unit that reads an index of separation for recycling the record medium which is printed on the recording medium; and a separation unit that automatically separates the recording medium according to the read index.

BRIEF DESCRIPTION OF THE DRAWINGS

The present invention may be more readily described with reference to the accompanying drawings:

FIG. 5 is a schematic representation to show the display of an option setting screen;

FIG. 8 is a schematic representation to show recycle classification information printed at the bottom center of the print face in double-sided print;

DETAILED DESCRIPTION OF THE PREFERRED EMBODIMENTS

Referring now to the accompanying drawings, there is shown a preferred embodiment of the invention.

Figure 1:
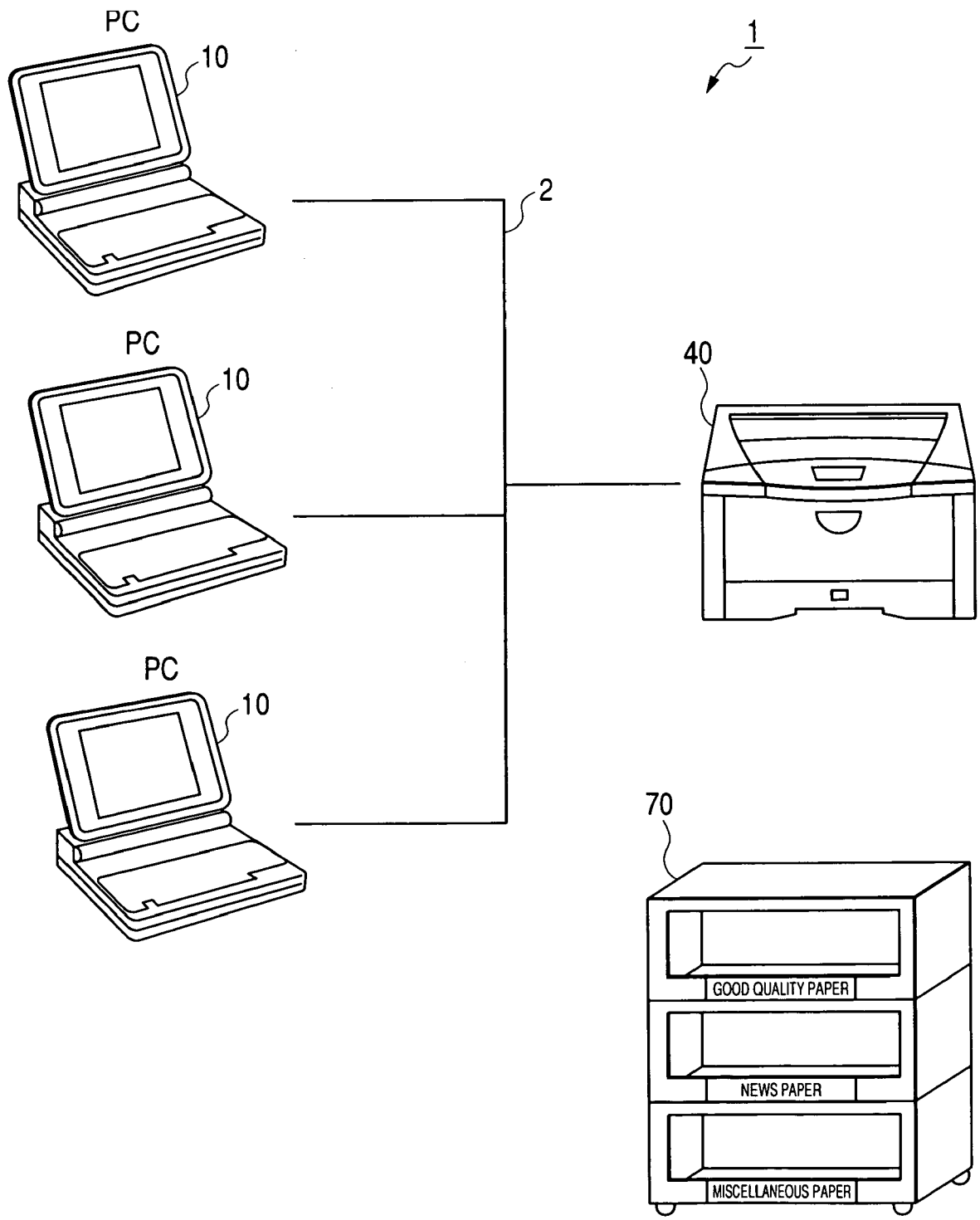
FIG. 1 is a schematic representation to show an image of an office having a print communication system of an embodiment of the invention.

FIG. 1 is a schematic representation to show an image of an office having a print communication system 1 of an embodiment of the invention.

As shown in FIG. 1, the print communication system 1 is made up of personal computers (PCs) 10 and a printer 40 connected by a LAN (local area network) 2 so that they can communicate with each other.

In the office, a separate collection box 70 is provided for collecting paper made unnecessary after an image is printed on the paper on the printer 40 for recycling, and the user separates paper into three groups of "good quality paper," "newspaper," and "miscellaneous paper" in response to the type of paper, the amount of the image printed on the paper, and the like, and discards the paper according to the group.

Figure 2:
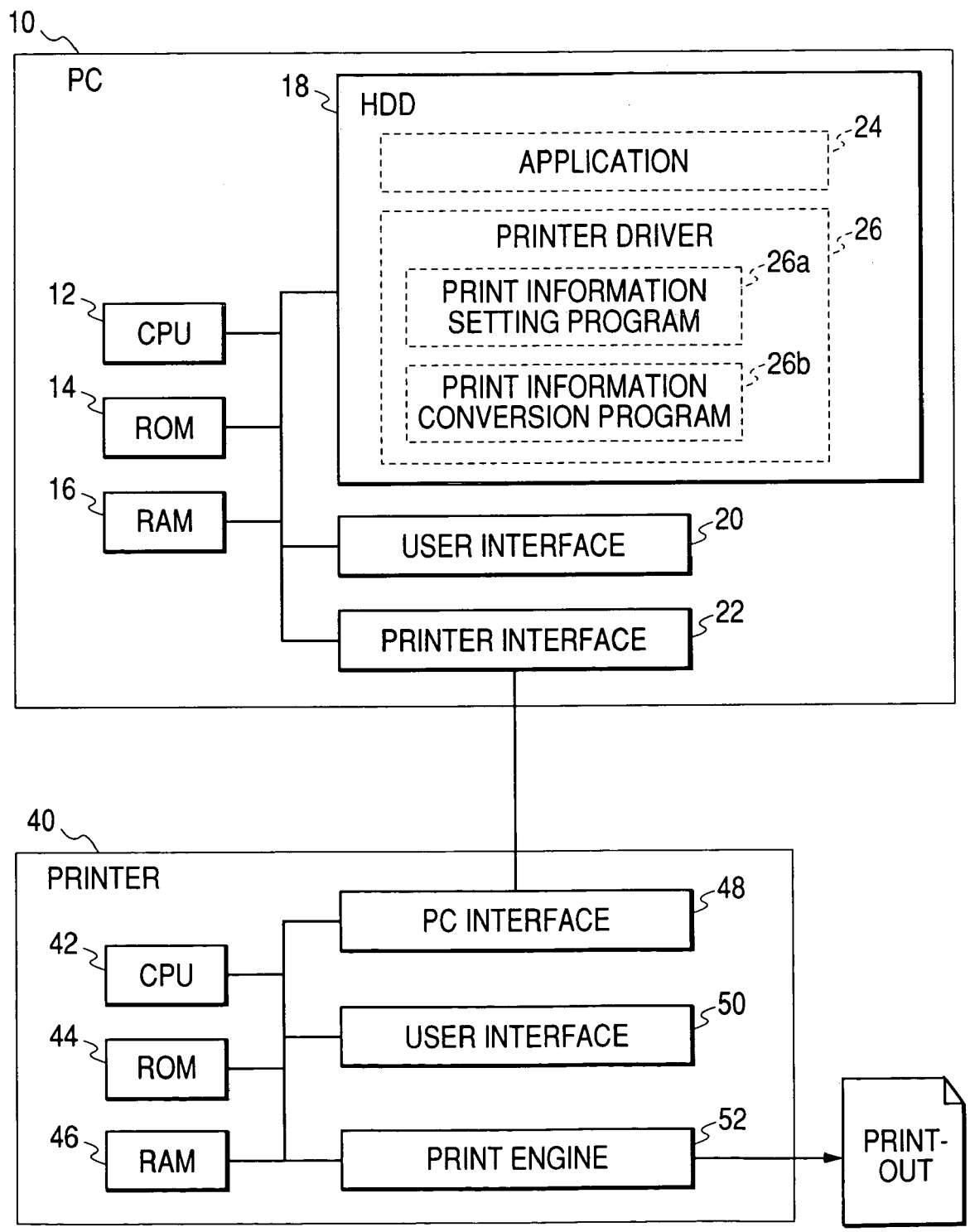
FIG. 2 is a block diagram to represent the schematic configurations of a PC and a printer.

FIG. 2 is a block diagram to represent the schematic configurations of each of the PCs 10 and the printer 40 making up the print communication system 1.

The PC 10 includes a CPU 12, ROM 14, RAM 16, a hard disk drive 18, a user interface 20 of a display, a keyboard, a mouse, etc., and a printer interface 22 for conducting communications with the printer 40.

Application programs (simply, applications) 24 such as word processing software and a printer driver 26 for the printer 40 are installed on the hard disk drive 18. The printer driver 26 includes a print information setting program 26a for allowing the user to make various settings concerning print and a print information conversion program 26b for performing print information conversion processing later described with reference to FIG. 13.

On the other hand, the printer 40 includes a CPU 42, ROM 44, RAM 46, a PC interface 48 for conducting communications with the PC 10, a user interface 50 of a display panel, operation switches, etc., and a print engine 52 for inputting image data (bit map data) and printing an image represented by the data on paper as a record medium.

The printer driver 26 installed on the hard disk drive 18 of the PC 10 will be discussed.

Figure 3:
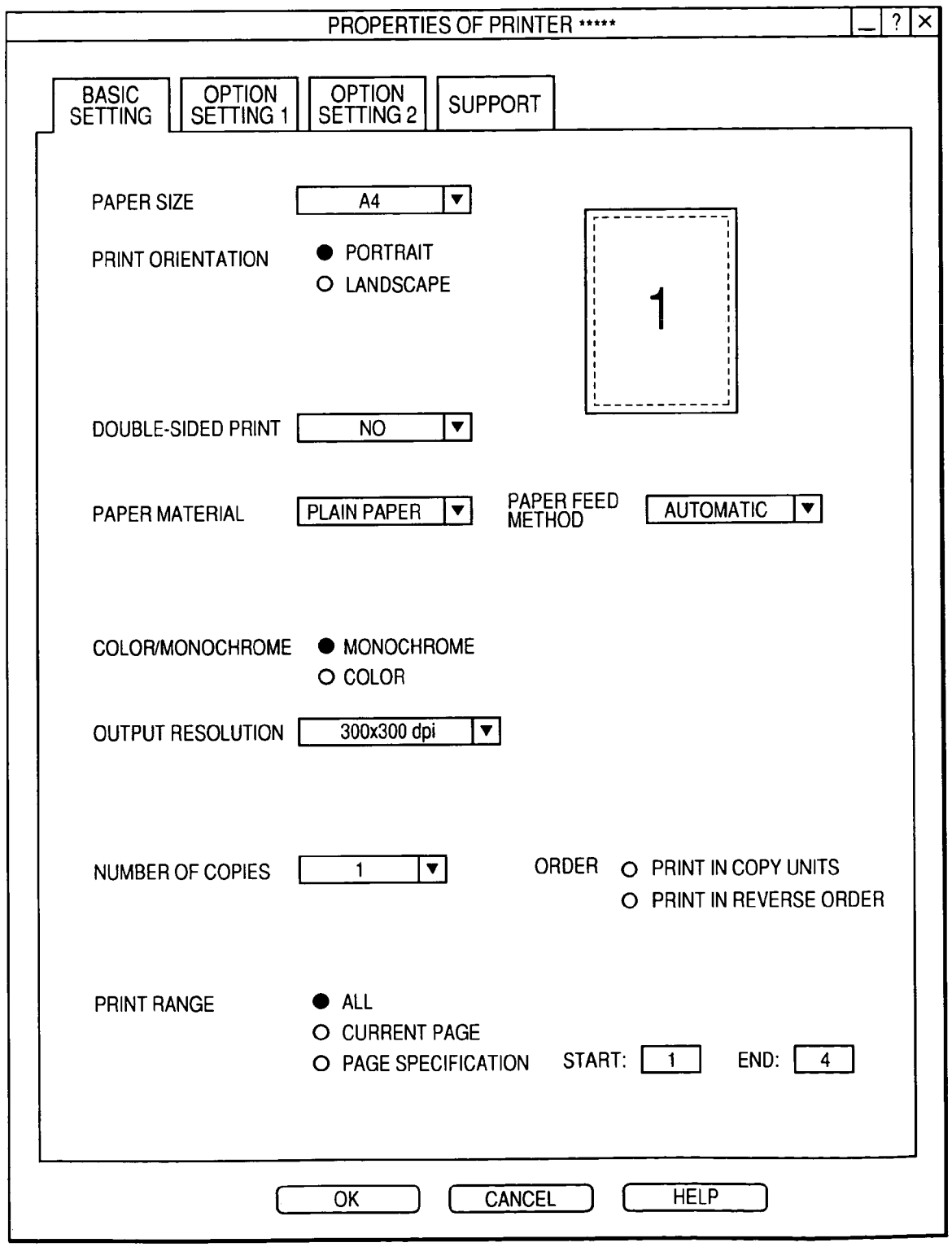
FIG. 3 is a schematic representation to show the display of a basic setting screen.

The printer driver 26 has a function of displaying a basic setting screen concerning print on a display for allowing the user to make various settings as a similar function to a known printer driver in a related art. Specifically, as shown in FIG. 3, the user is allowed to operate the mouse, etc., to set the paper size, print orientation, specification as to whether or not double-sided print is executed, paper material, paper feed method, color/monochrome, output resolution, the number of print copies, the print order, and the print range.

Figure 4:
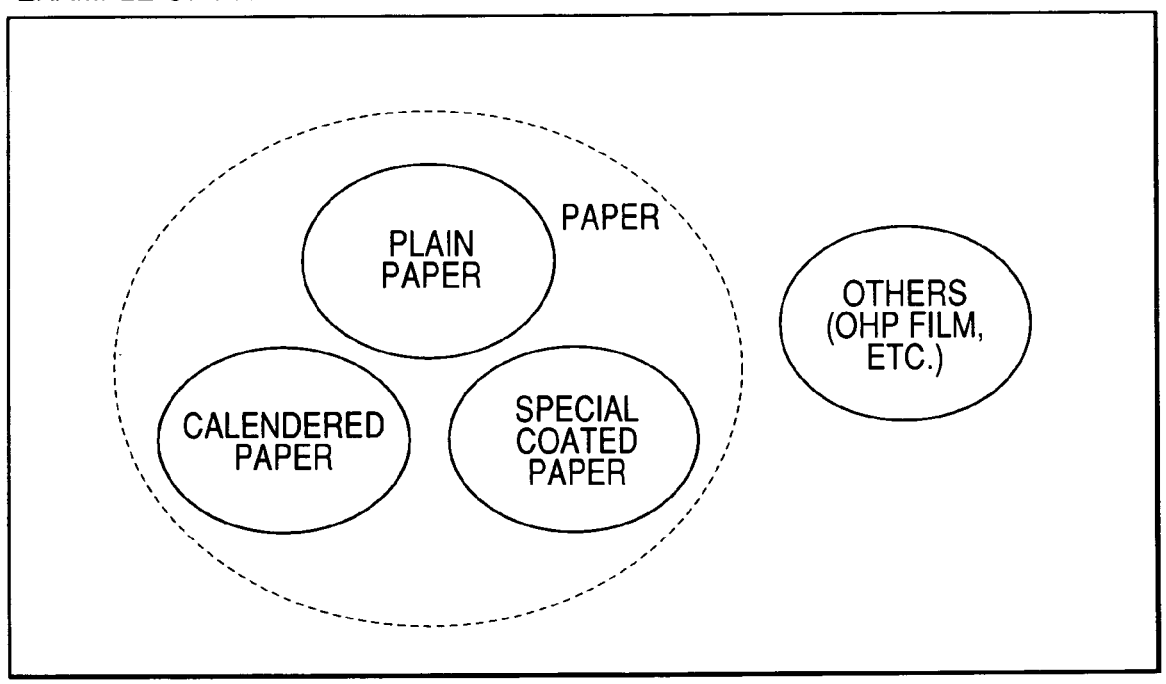
FIG. 4 is a schematic representation to describe classification of paper materials.

In the printer driver 26, the paper material is classified into four types of "plain paper," "glossy paper," "special coated paper," and "others (OHP film, etc.,)" as shown in FIG. 4. In a paper material setting field on the basic setting screen in FIG. 3, the user selects the material to which the paper set on the printer 40 corresponds from among the four types of materials.

By the way, in the print communication system 1 of the embodiment, recycle classification information (corresponding to an index image) used as an index of separation for the user to discard paper in the separate collection box 70 can be printed on paper. Specifically, to print an image on paper, the group name ("good quality paper," "newspaper," or "miscellaneous paper") under which the paper falls is printed on the paper as the recycle classification information.

To realize such a function, the printer driver 26 for the printer 40 of the embodiment allows the user to make various settings concerning indication of the recycle classification information, which will be hereinafter referred to as recycle classification information relevant settings, on an option setting screen separate from the basic setting screen. Specifically, the user is allowed to operate the mouse, etc., to set specification as to whether or not recycle classification information indication is made, classification condition according to the print area ratio, classification condition according to the paper type, and recycle classification information indication method, as shown in FIG. 5.

Here, the recycle classification information relevant settings will be discussed.

[Setting Specification as to Whether or Not Recycle Classification Information Indication is Made]

In this field, to print an image on paper on the printer 40, specification as to whether or not recycle classification information indication is made together with the image is set. If the user sets recycle classification information indication to "YES" in the field, recycle classification information is printed on paper on which an image is printed on the printer 40 in addition to the image. On the other hand, if the user sets recycle classification information indication to "NO," recycle classification information is not printed on paper, namely, only the image to be printed is printed on paper as in related arts.

[Setting Classification Condition According to Print Area Ratio]

In this field, the paper classification condition is set based on the print area ratio.

Figure 6:
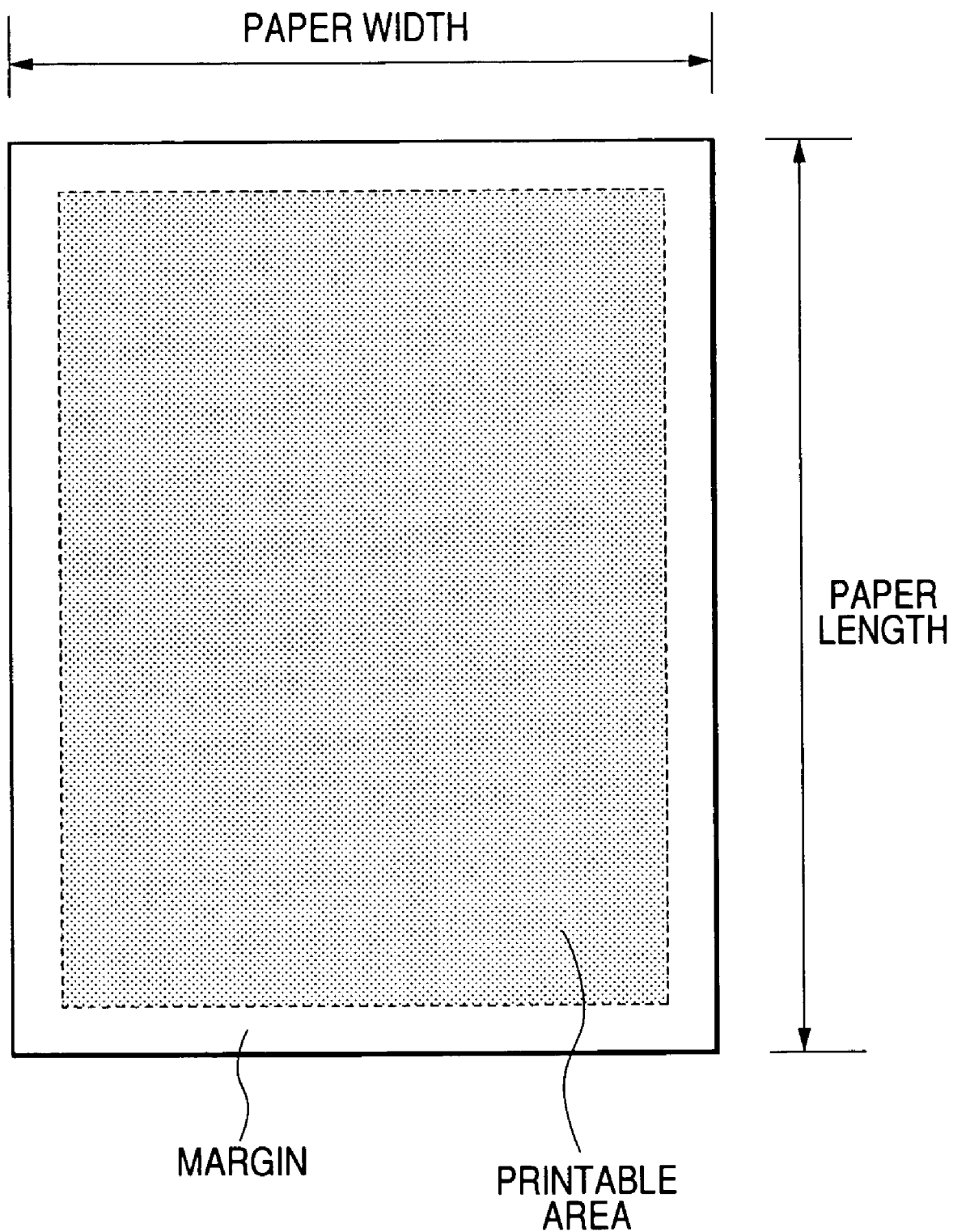
FIG. 6 is a schematic representation to describe the print ratio.

The print area ratio (also called the print ratio) is a value indicating the ratio of the area of the image printed on paper to the paper area of printable area plus margin (whole paper area), as shown in FIG. 6.

That is, in the embodiment, the print ratio is defined according to the following expression:

$$\text{Print ratio} = \text{number of record dots per page}/(\text{main scanning record resolution} \times \text{subscanning record resolution} \times \text{paper area}) \quad \text{Expression (1)}$$

The paper area mentioned here is the sum of the areas of both sides of the paper; for example, for letter paper having a paper width of 8.5 inches and a paper length of 11 inches, the paper area is $8.5 \times 11 \times 2 = 187$ [inch$^2$]. For example, if an image of 673200 dots as the total number of record dots (pixels) on one page is printed on the letter paper with main scanning record resolution×subscanning record resolution set to 300× 300 dpi, the print ratio is $$673200/(300 \times 300 \times 187) = 0.04 \, (4\%)$$

according to expression (1).

In the embodiment, for the pixels of black (K), yellow (Y), magenta (M), and cyan (C) print colors contained in a color image, the monochrome print ratio of the print ratio for the black (K) pixels and the color print ratio of the print ratio for the pixels of other colors (yellow (Y), magenta (M), and cyan (C)) are calculated separately and the classification condition is set based on the print ratios.

To calculate the color print ratio, if the numbers of the pixels of the colors are simply totaled up, the print area is calculated three times the actual print area for dot formation of the three colors at the same position. Thus, preferably correction is made. For example, the color print ratio can be found based on the sum total of the number of pixels of cyan (C), the number of pixels of magenta (M) not overlapping the pixels of cyan (C), and the number of pixels of yellow (Y) not overlapping the pixels of cyan (C) or magenta (M).

Specifically, the permissible percentages of the monochrome print ratio and the color print ratio are set for each of group No. 1 to group No. 3, as shown in FIG. 5.

In the example shown in FIG. 5, for group No. 1, the permissible percentage of the monochrome print ratio is set to 20% and that of the color print ratio is set to 0% and if either the monochrome print ratio or the color print ratio exceeds the permissible percentage, the corresponding paper does not fall under group No. 1. For group No. 2, the permissible percentage of the monochrome print ratio is set to 40% and that of the color print ratio is set to 10% and if either the monochrome print ratio or the color print ratio exceeds the permissible percentage, the corresponding paper does not fall under group No. 2. For group No. 3, the permissible percentages of the monochrome print ratio and the color print ratio are set to 100%, and paper falls under group No. 3 regardless of the value of the print ratio.

To change the permissible percentage on the option setting screen in FIG. 5, the user moves the arrow position on the option setting screen from side to side with the mouse.

[Setting Classification Condition According to Paper Type]

In this field, the paper classification condition is set based on the paper type. Here, the paper material and the paper size are set as the paper type.

In the field of the paper material, the user selects the permissible material among the four types of materials of "plain paper," "glossy paper," "special coated paper," and "others (OHP film, etc.,)" previously described with reference to FIG. 4 from among "only plain paper," "general paper," and "no specification." Here, the expression "only plain paper" is used to mean that only "plain paper" is permitted among the four types of materials. The expression "general paper" is used to mean that "plain paper," "glossy paper," and "special coated paper" are permitted among the four types of materials and "others (OHP film, etc.,)" are not permitted. The expression "no specification" is used to mean that the four types of materials are all permitted.

In the field of the paper size, the user selects the permissible paper size from among the four options of "postcard or larger," "B5 or larger," "A4 or larger," and "no specification." Here, the expression "postcard or larger" is used to mean that paper of postcard size or larger is permitted. Likewise, the expression "B5 or larger" is used to mean that paper of B5 size or larger is permitted; the expression "A4 or larger" is used to mean that paper of A4 size or larger is permitted. The expression "no specification" is used to mean that paper is permitted regardless of the size.

In the field of the indication name, the user enters the group name to be printed on paper as the recycle classification information for group No. 1 to group No. 4 (in the embodiment, "good quality paper," "newspaper," or "miscellaneous paper")

In the example in FIG. 5, group No. 4 is not used and thus no entry is made.

[Setting Recycle Classification Information Indication Method]

In this field, as for the recycle classification information indication method, the user sets the indication position of the recycle classification information, the font of the recycle classification information, and additional information indicated together with the group name.

In the field of the indication position, the user selects the indication position (print position) of the recycle classification information from among the three options of "bottom center of print face," "top center of print face," and "four corners of print face." In the example in FIG. 5, "bottom center of print face" is selected.

Figure 7:
FIG. 7 is a schematic representation to show recycle classification information printed at the bottom center of the print face in single-sided print.

The expression "bottom center of print face" is used to mean that the recycle classification information is printed at the center of the bottom of the image print face of paper. For example, in the single-sided print mode, the recycle classification information is printed only on one side of paper (image print face) as shown in FIG. 7; in the double-sided print mode, there cycle classification information is printed on both sides of paper as shown in FIG. 8.

Likewise, the expression "top center of print face" is used to mean that the recycle classification information is printed at the center of the top of the image print face of paper.

Figure 9:
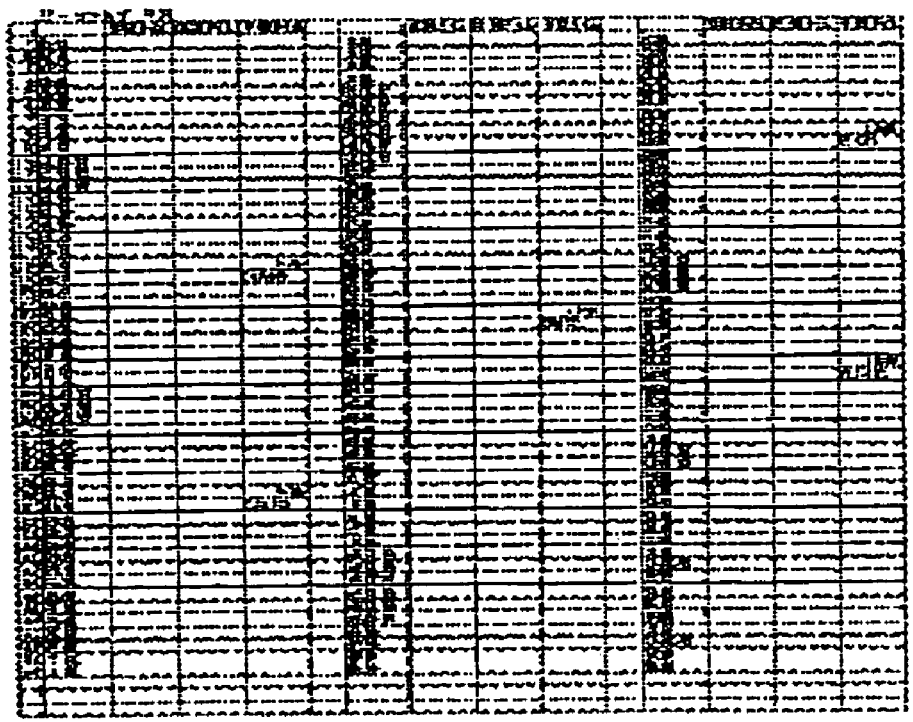
FIG. 9 is a schematic representation to show recycle classification information printed in the four corners of the print face.

On the other hand, the expression "four corners of print face" is used to mean that the recycle classification information is printed in the four corners of the image print face of paper, for example, as shown in FIG. 9.

In the embodiment, if the indication position is set to "bottom center of print face" or "top center of print face," the recycle classification information is printed like "======RECYCLE GROUP: NEWSPAPER======" so that the fact that recycle classification information is indicated is emphasized, as shown in FIGS. 7 and 8. If the indication position is set to "four corners of print face," only the group name is printed like GOOD QUALITY PAPER as shown in FIG. 9. If the group name is printed in the four corners of the print face, it can be easily understood that the character string of the group name is a different image from the essential image; however, if the group name is printed only one at the top or the bottom of the print face, the possibility that the character string of the group name may be misconstrued as a part of the essential image is high.

On the other hand, in the field of the font shown in FIG. 5, the user sets the font of the recycle classification information to be printed on paper. In the example in FIG. 5, the font is set to Gothic with 10 pt.

In the field of the additional information, the user selects information added to the group name as the recycle classification information. Here, to specify whether or not each of "print area ratio (%) indication," "paper material/size information indication," and "bar code indication" is to be added, the user can enter a check mark in the corresponding check box.

Figures 10, 11, 12:
FIG. 10 is a schematic representation to show recycle classification information to which print area ratios are added.
FIG. 11 is a schematic representation to show recycle classification information to which paper material and paper size information is added.
FIG. 12 is a schematic representation to show recycle classification information to which bar code indication is added.

For example, if "print area ratio (%) indication" is selected, the monochrome print ratio and the color print ratio are printed to the side of the group name, as shown in FIG. 10. In the example in FIG. 10, the group name is "good quality paper" and the monochrome print ratio and the color print ratio are 6% and 2%.

For example, if "paper material/size information indication" is selected, the paper material and the paper size are printed to the side of the group name, as shown in FIG. 11. In the example in FIG. 11, the group name is "miscellaneous paper," the paper material is "special coated paper," and the paper size is "A4."

For example, if "bar code indication" is selected, the bar code to represent the group name (in the example, "good quality paper") is printed to the side of the group name, as shown in FIG. 12.

In the embodiment, the group name is always indicated as the recycle classification information, but the invention is not limited to it. For example, the print ratio, the paper material, etc., may be indicated without indicating the group name. In doing so, if the user (or waste paper collection trader) grasps the classification condition based on the print ratio, the paper material, etc., the user (or waste paper collection trader) can reference the indicated recycle classification information for separating paper.

As the recycle classification information is printed, the print ratio increases accordingly. Thus, it is desirable that the image representing the recycle classification information should be an image having a small effect on the print ratio (for example, an image of a small number of pixels). If the recycle classification information printed on paper is also contained to calculate the print ratio, the more precise print ratio can be found. For example, if the number of pixels of each of different types of recycle classification information images is previously stored and the number of pixels of the recycle classification information image to be printed on paper is added to the number of pixels of the essential image to be printed on paper and then the print ratio is calculated, the print ratio also involving the recycle classification information image can be calculated easily.

On the other hand, a SAVE USER DEFINITION button and a READ USER DEFINITION button are provided in the lower part of the display screen shown in FIG. 5. If the user clicks the SAVE USER DEFINITION button, the current setup setting conditions can be saved as a file. If the user clicks the READ USER DEFINITION button, the file representing the saved setting conditions can be read as required. Thus, a file corresponding to the collection trader's classification condition is provided and, for example, is shared among the users in the office, whereby the inconvenience of setting the classification condition, etc., individually, setting mistakes, etc., can be decreased.

On the other hand, the printer driver 26 also includes the print information conversion program 26b for accomplishing print of recycle classification information on paper. Print information conversion processing performed by the CPU 12 of the PC 10 in accordance with the print information conversion program 26b will be discussed with a flowchart of FIG. 13. As an image print request is issued from the application 24, etc., to the printer 40, the print information conversion processing is started.

When the print information conversion processing is started, first at S110, bit map data (raster image data) is generated as image data of the image to be printed. The bit map data is generated based on the current setup values of the paper size, the output resolution, etc.

Subsequently, at S120, whether or not recycle classification information indication is set to "YES" is determined.

If it is determined at S120 that recycle classification information indication is set to "YES," the process goes to S130 and the print ratios (specifically the monochrome print ratio and the color print ratio) are calculated for the image to be printed. The print ratios are calculated based on the number of pixels of the bit map data generated at S110 and the current setup paper size and output resolution.

Subsequently, at S140, the current setup paper material (paper material set by entry operation of the user on the basic setting screen in FIG. 3) is determined.

Subsequently, at S150, the current setup paper size (paper size set by entry operation of the user on the basic setting screen in FIG. 3) is determined.

Subsequently, at S160, the recycle group under which the paper on which the image is to be printed falls (any of the three types of group No. 1 to group No. 3) is determined based on the print ratios calculated at S130, the paper material determined at S140, and the paper size determined at S150.

To determine the recycle group, whether or not the conditions (classification conditions set by entry operation of the user on the option setting screen in FIG. 5) are satisfied is determined starting at group No. 1 in order. That is, first, whether all acceptable conditions for group No. 1 are satisfied is determined and if all are satisfied, the paper is determined to fall under group No. 1 (in the embodiment, "good quality paper"). On the other hand, if the paper does not fall under group No. 1, whether all acceptable conditions for group No. 2 are satisfied is determined and if all are satisfied, the paper is determined to fall under group No. 2 (in the embodiment, "newspaper"). On the other hand, if the paper does not fall under group No. 2 either, whether all acceptable conditions for group No. 3 are satisfied is determined and if all are satisfied, the paper is determined to fall under group No. 3 (in the embodiment, "miscellaneous paper"). In the classification conditions in the embodiment, if paper falls under neither group No. 1 nor group No. 2, the paper falls under group No. 3.

Thus, for example, if the monochrome print ratio is 10%, the color print ratio is 0%, the paper material is plain paper, and the paper size is A4, all acceptable conditions for group No. 1 set on the option setting screen in FIG. 5 are satisfied and therefore the paper is determined to be "good quality paper."

For example, if the color print ratio is 5% in the conditions, the paper is determined to be "newspaper."

For example, if the paper size is smaller than the postcard size, the paper is determined to be "miscellaneous paper" regardless of other conditions.

After the recycle group is thus determined at S160, the process goes to S170 and the bit map data of the image to be printed to which the image representing the recycle classification information based on the determination at S160 is added is generated. Here, the bit map data is generated based on the settings of the current setup recycle classification information indication position, font of recycle classification information, additional information indicated together with the group name, whether or not double-sided print is executed, and the like.

Subsequently, the process goes to S180 and the bit map data is transmitted through the printer interface 22 to the printer 40 and then the print information conversion processing is terminated.

On the other hand, if it is determined at S120 that recycle classification information indication is set to "NO," S130 to S170 are skipped and the process goes to S180 at which the bit map data is transmitted through the printer interface 22 to the printer 40. Then, the print information conversion processing is terminated.

Thus, in the print information conversion processing, if image print operation is performed with the recycle classification information indication set to "YES," the bit map data of the image to be printed to which the recycle classification information image is added is generated and is transmitted to the printer 40.

In the printer 40, the bit map data is received through the PC interface 48 and the image represented by the bit map data is printed on paper by the print engine 52. Accordingly, the recycle classification information image used as the index for the user to separate and discard the paper in the separate collection box 70 as well as the image to be printed is printed on the paper.

Consequently, the user can reference the recycle classification information printed on the paper to easily separate the paper when discarding the paper in the separate collection box 70.

As described above, according to the print communication system 1 of the embodiment, the group name is printed on paper, thereby enabling the user to precisely and easily separate the paper in discharging the paper, resulting in contributing to promotion of recycling paper.

Particularly, the print communication system 1 enables the user to set the paper classification conditions and therefore can also deal with the case where the classification condition varies from one waste paper collection trader to another, for example.

The print communication system 1 also enables the user to specify whether or not the recycle classification information is to be printed on paper. Thus, the problem of printing the recycle classification information although the document is a document on which the recycle classification information is not to be printed can be circumvented.

Further, in the print communication system 1, the recycle classification information can be printed in a bar code. Thus, for example, to use an automatic separation unit for optically reading the bar code printed on paper, determining the group name, and automatically separating the paper according to the determined group name, paper separation work can be made still more efficient. For example, the document on which confidential information is printed may not need the recycle classification information.

Figure 16:
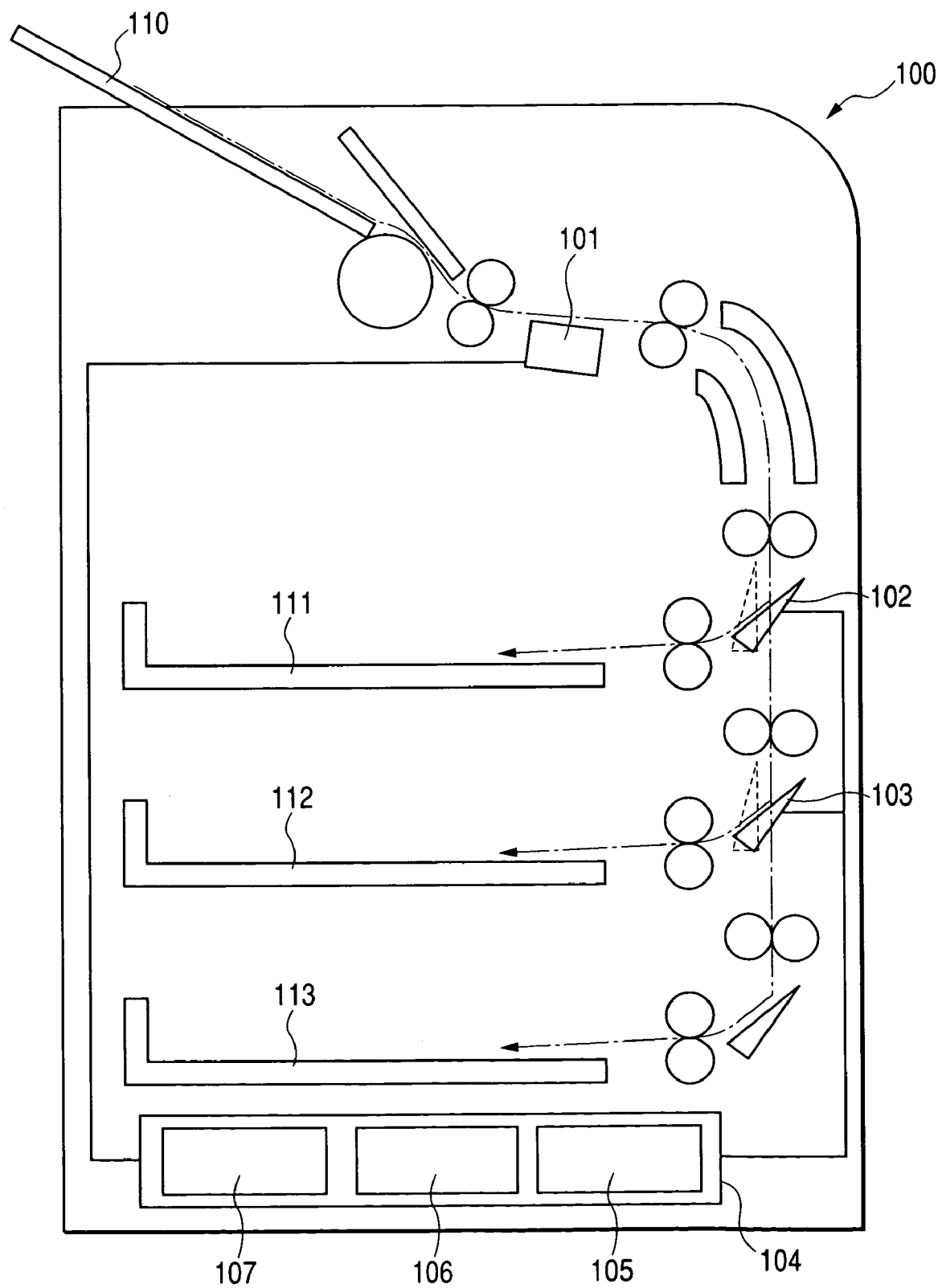
FIG. 16 is a schematic view showing an automatic separation apparatus according to an embodiment of the invention.

FIG. 16 shows an example of such an automatic separation unit. The automatic separation unit 100 shown in FIG. 16 includes a paper receiving portion 110 for receiving paper into the automatic separation unit 100, a reading unit 101 for optically reading bar codes or other index images, flappers 102 and 103 used for sorting the received paper into accommodating trays 111, 112 and 113 each provided according to the types of paper. The reading unit 101 is connected to a control unit 104 including a driving control unit 105 for controlling driving the flapper 102, 103, an image processing unit 107 for processing the image read at the reading unit 101 and a separation decision unit 106. The image processing unit 107 analyzes the read image transmitted from the read unit 101 to obtain information that is represented by the bar codes or the index image. The obtained information is transmitted to the separation decision unit 106. The separation decision unit 106 determines which the accommodation tray 111, 112 or 113 the paper should be transported to. The driving control unit 105 controls the flappers 102 and 103 according to the determination of the separation decision unit 106.

In addition, in the print communication system 1, the dedicated printer driver 26 needs only to be installed and the general-purpose PC 10 and the general-purpose printer 40 can be used intact, so that the print communication system 1 can be implemented at extremely low cost.

Although the embodiment of the invention has been described, it is to be understood that variations may be made without departing from the spirit and the scope of the invention, needless to say.

For example, in the print communication system 1 of embodiment, the processing of adding the recycle classification information image to the image to be printed is performed in the PC 10, but the invention is not limited to the mode. For example, the processing may be performed in the printer 40.

Figure 13:
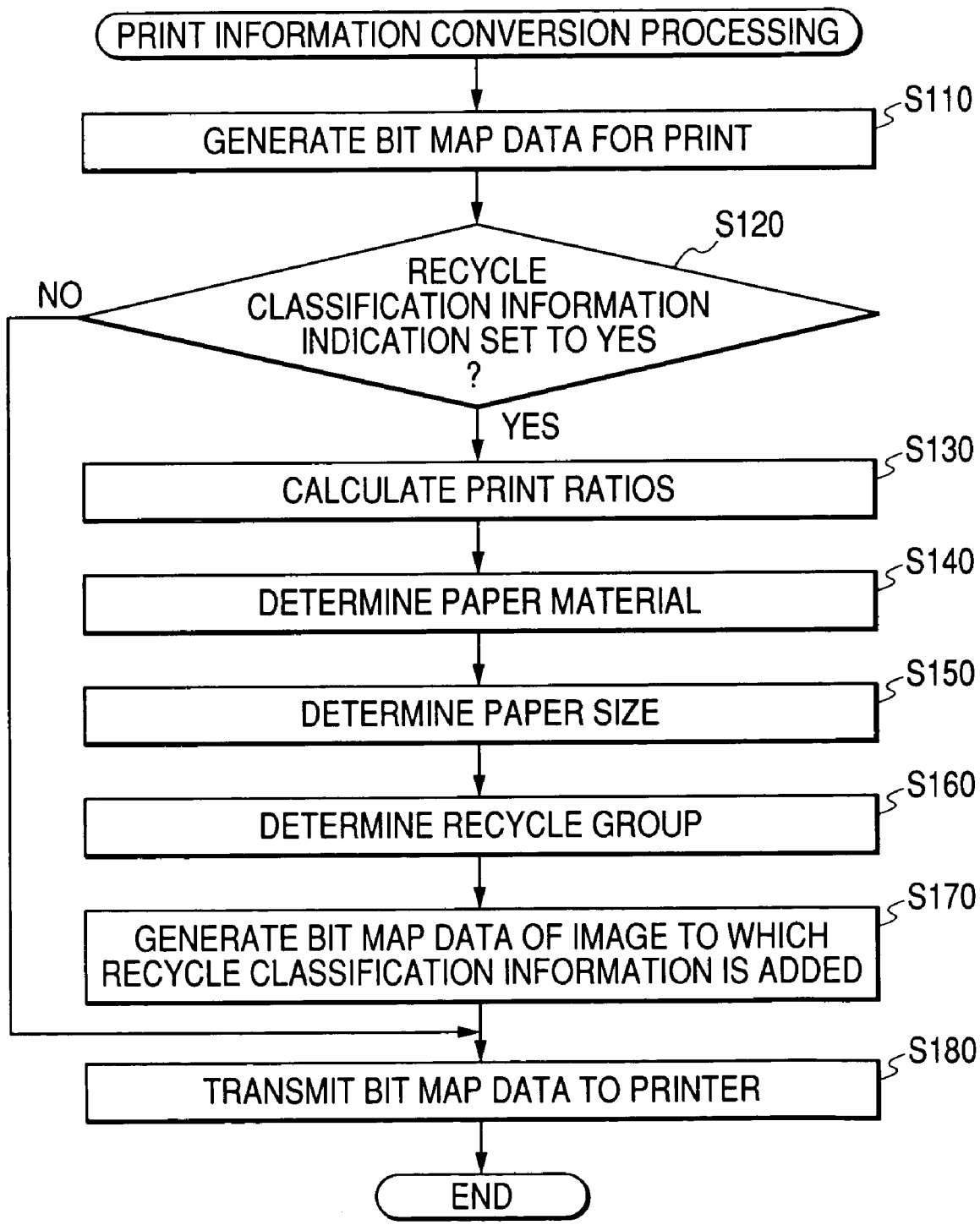
FIG. 13 is a flowchart of print information conversion processing.
Figure 14:
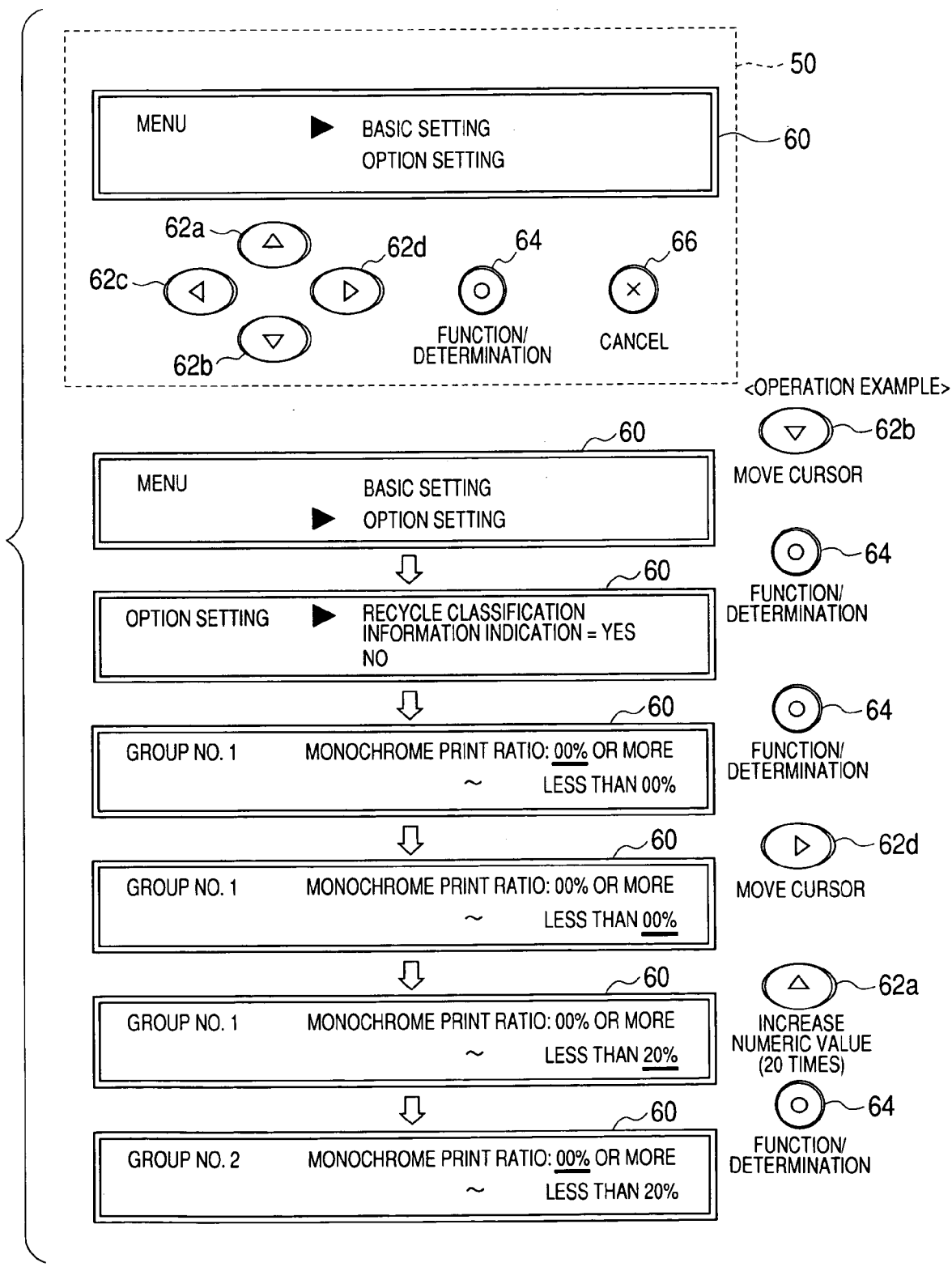
FIG. 14 is a schematic representation to show an example for making recycle classification information relevant settings at a user interface of the printer.

That is, the recycle classification information relevant settings made by the user on the option setting screen in FIG. 5 are handled in the printer 40 rather than the PC 10. Further, S120 to S170 in FIG. 13 are executed in the printer 40 rather than the PC 10. The configuration for this purpose will be discussed below specifically:

FIG. 14 is a schematic representation to show an example for making recycle classification information relevant settings at the user interface 50 of the printer 40.

The user interface 50 includes a display panel 60, four direction switches 62a, 62b, 62c, and 62d for indicating up and down and left and right directions, a function/determination switch 64 for determining the input value, etc., and a cancel switch 66 for canceling the command.

As menu screen items, BASIC SETTING and OPTION SETTING are displayed on the display panel 60. In this state, if the user selects OPTION SETTING by pressing the direction switch 62b and further pressing the function/determination switch 64, the menu screen changes to a selection screen for selecting recycle classification information indication=YES or NO. In this state, if the user selects RECYCLE CLASSIFICATION INFORMATION INDICATION=YES by pressing the function/determination switch 64, the selection screen changes to a classification condition setting screen according to the print ratios. To set the permissible percentage of the monochrome print ratio for group No. 1 to 20%, for example, on the setting screen, the user presses the direction switch 62d to move a cursor to any desired position and further presses the direction switch 62a as many times as required for increasing the numeric value. Then, the user presses the function/determination switch 64, whereby the next setting (in this case, setting the permissible percentage of the monochrome print ratio for group No. 2) can be made. As the settings are thus made in order, the recycle classification information relevant settings can be made in the same manner as in the embodiment described above.

Figure 15:
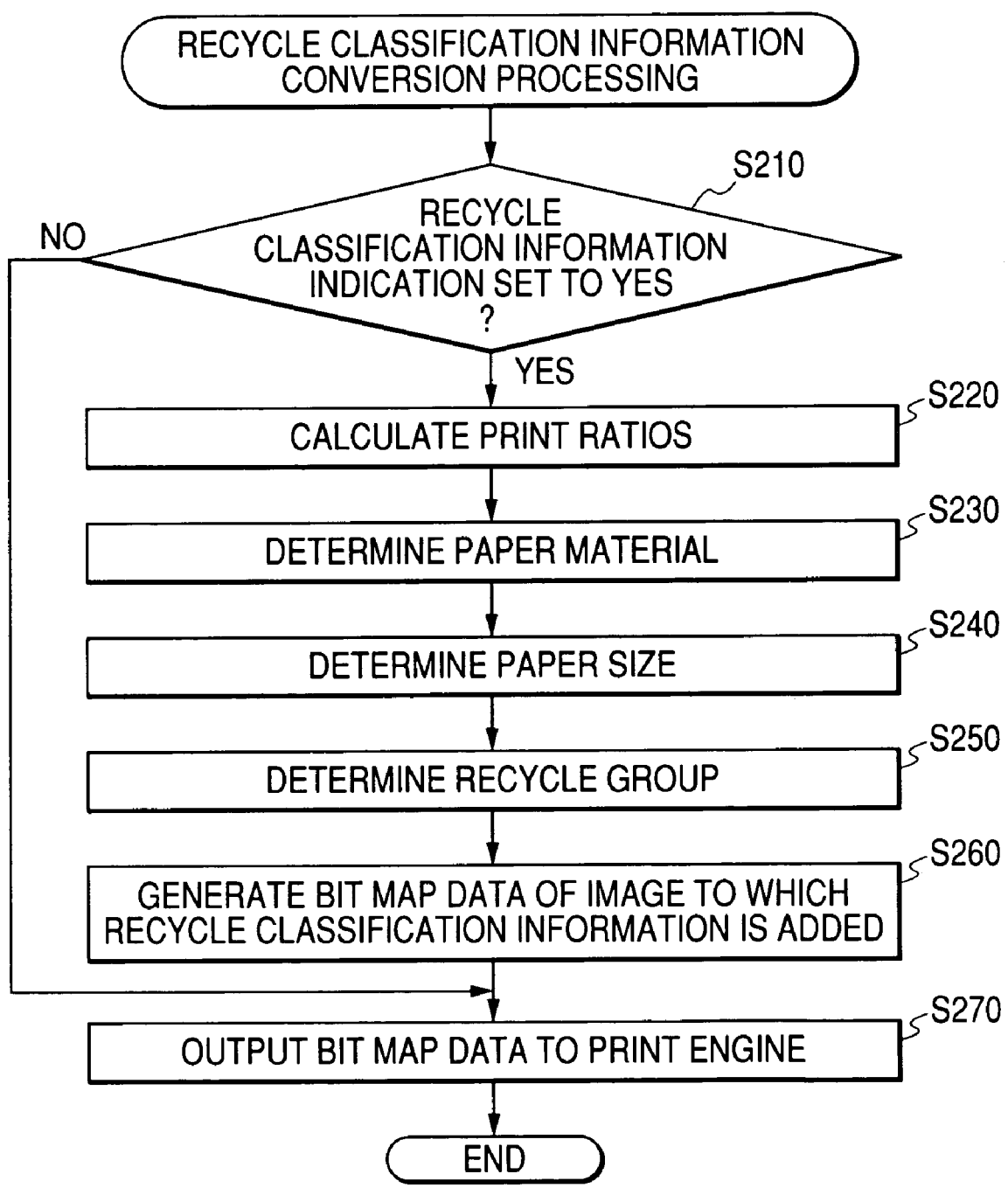
FIG. 15 is a flowchart of recycle classification information print processing.

The ROM 44 of the printer 40 stores a recycle classification information print program for performing similar processing to the steps S120 to S170 previously described with reference to FIG. 13 in the embodiment. The recycle classification information print processing performed by the CPU 42 of the printer 40 in accordance with the recycle classification information print program will be discussed with a flowchart of FIG. 15. The recycle classification information print processing is started upon reception of the bit map data representing the image to be printed from the PC 10.

When the recycle classification information print processing is started, first, at S210, whether or not recycle classification information indication is set to "YES" is determined.

If it is determined at S210 that recycle classification information indication is set to "YES," the process goes to S220 and the print ratios (specifically the monochrome print ratio and the color print ratio) are calculated for the image to be printed. The print ratios are calculated based on the number of pixels of the bit map data received from the PC 10 and the current setup paper size and output resolution, as described above.

Subsequently, at S230, the current setup paper material (paper material set by entry operation of the user on the basic setting screen in FIG. 3 in the PC 10) is determined.

Subsequently, at S240, the current setup paper size (paper size set by entry operation of the user on the basic setting screen in FIG. 3 in the PC 10) is determined. The information of the current setup paper material and paper size is transmitted from the PC 10 together with the bit map data representing the image to be printed.

Subsequently, at S250, the recycle group under which the paper on which the image is to be printed falls is determined based on the print ratios calculated at S220, the paper material determined at S230, and the paper size determined at S240.

Subsequently, at S260, the bit map data of the image to be printed to which the image representing the recycle classification information based on the determination at S250 is added is generated. Here, the bit map data is generated based on the settings of the current setup recycle classification information indication position, font of recycle classification information, additional information indicated together with the group name, whether or not double-sided print is executed, and the like.

Subsequently, the process goes to S270 and the bit map data is output to the print engine 52 and then the recycle classification information print processing is terminated.

On the other hand, if it is determined at S210 that recycle classification information indication is set to "NO," S220 to S260 are skipped and the process goes to S270 at which the bit map data is output to the print engine 52. Then, the recycle classification information print processing is terminated.

Thus, in the recycle classification information print processing, if the bit map data representing the image to be printed is transmitted from the PC 10 with the recycle classification information indication set to "YES," the bit map data of the image to be printed to which the recycle classification information image is added is generated and is output to the print engine 52. The print engine 52 performs the operation of printing the image represented by the bit map data on paper. Accordingly, the recycle classification information image used as the index for the user to separate and discard the paper in the separate collection box 70 as well as the image to be printed is printed on the paper.

According to the configuration, similar advantages to those of the print communication system 1 of the embodiment described above can also be provided.

On the other hand, the print communication system 1 can also be configured so that the recycle classification information relevant settings are handled in the PC 10 and the processing of adding the recycle classification information image to the image to be printed (S210 to S260 in FIG. 15) is performed in the printer 40.

On the other hand, the invention may be applied not only to printers, but also to facsimiles, copiers, etc., involving the print function. For example, the printer 40 in FIG. 1 may be replaced with a facsimile, copier, etc.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A print controller for controlling an image print unit to print an index image on a recording medium to be used for separation when a printed record medium is recycled, comprising:
   an output unit that outputs image data representing an image to be printed on the record medium to the image print unit;
   an index unit that determines a group name for the separation based on a printing condition and a criterion, and determining the index image representing the group name to be printed on the record medium together with the image by the image print unit; and
   a changing unit that changes the criterion based on a command inputted to the print controller.

2. The print controller as claimed in claim 1,
   wherein the printing condition is determined based on at least one of the image data and type of the record medium.

3. The print controller as claimed in claim 1, further comprising: an index print unit that produces image data representing the index image.

4. The print controller as claimed in claim 3,
   wherein the index print unit causes the output unit to output the image data so as to include the image data representing the index image.

5. The print controller as claimed in claim 3,
   wherein the index print unit causes the image print unit to print the index image on the same side of the record medium as the image.

6. The print controller as claimed in claim 3, further comprising an inhibition unit that inhibits an operation of the index print unit based on entry operation.

7. The print controller as claimed in claim 1,
   wherein the index unit includes a print ratio calculation unit that calculates the occupation ratio of the image to the record medium on which the image is printed as a print ratio; and
   the index unit determines the group name based on the print ratio.

8. The print controller as claimed in claim 7,
   wherein the print ratio calculation unit calculates the print ratio based on the number of pixels of the image to be printed.

9. The print controller as claimed in claim 7,
   wherein the print ratio represents the ratio of the area of the image to the area of both sides of the record medium on which the image is to be printed.

10. The print controller as claimed in claim 7,
    wherein the index image includes the print ratio.

11. The print controller as claimed in claim 7,
    wherein the print ratio calculation unit calculates the print ratio based on the number of pixels of the image based on the image data and the number of pixels of the index image to be printed on the record medium.

12. The print controller as claimed in claim 1,
    wherein the index unit determines the group name based on color of the image.

13. The print controller as claimed in claim 1, further comprising:
    a medium judgement unit that judges a type of the record medium;
    wherein the index unit determines the group name based on the type of the record medium.

14. The print controller as claimed in claim 13,
    wherein the medium judgement unit judges the type of the record medium based on an entry operation.

15. The print controller as claimed in claim 1,
    wherein the index image includes a bar code representing an index indication description thereof.

16. The print controller as claimed in claim 1,
    wherein the index unit decides the index image based on color of the image.

17. The print controller as claimed in claim 1,
    wherein the index unit decides the group name based on a size of the recording medium.

18. The print controller as claimed in claim 1,
    wherein the index unit decides the group name based on a content of the image.

19. The print controller as claimed in claim 1, further comprising a display controller that controls a display to display a setting screen for inputting a command for changing the criterion.

20. An image forming apparatus comprising:
    an image print unit that prints an image on the record medium;
    a printer controller;
    wherein the printer controller includes an output unit that outputs image data representing the image to the image print unit, an index unit that decides a group name based on a printing condition and a criterion, and decides an index image representing the group name to be used as an index of separation for recycling the record medium, and a changing unit that changes the criterion based on a command inputted to the print controller, and
    wherein the image print unit prints the index image on the record medium.

21. The image forming apparatus as claimed in claim 20, further comprising:
a scanner to scan an image from an original; and
a data producing unit that produces the image data based on the scanned image;
wherein the output unit outputs the image data produced by the data producing unit.

22. The image forming apparatus as claimed in claim 20, wherein the image forming apparatus is capable of receiving data from an external data sending apparatus;
the image forming apparatus further comprising:
a data receiving unit that receives data; and
a data producing unit that produces the image data based on the received data;
wherein the output unit outputs the image data produced by the data producing unit.

23. A computer-readable medium having a computer program stored thereon and readable by a computer, the computer program, when executed by the computer, causes the computer to perform operations comprising:
determining a type of a record medium on which an image to be printed is printed; and
determining a group name based on the determined type of the record medium and a criterion and determining an index image representing the determined group name used as an index of separation for recycling the record medium;
performing processing to print the index image on the record medium; and
changing the criterion based on a command inputted to the computer.

24. An automatic separation apparatus, comprising:
a paper receiving unit that receives a recording medium;
a reading unit that reads an index of separation for recycling the record medium which is printed on the recording medium;
a separation unit that automatically separates the recording medium according to the read index and a criterion; and
a changing unit that changes the criterion based on a command inputted to the apparatus.

25. A controller for an image forming apparatus to form an image on a recording medium, comprising:
an output unit that outputs image data representing the image to be on the recording medium to the image forming apparatus;
a medium judging unit that judges the type of the recording medium;
an additional image selecting unit that selects a first image to be additionally formed on the recording medium together with the image when the judged type of recording medium falls under a category and selects a second image to be additionally formed on the recording medium together with the image when the judged type of recording medium is out of the category; and
a changing unit that changes the category based on a command inputted to the controller.

26. A print controller for controlling an image print unit to print an image on a record medium, comprising:
an output unit that outputs image data representing the image to the image print unit;
an index unit that determines a group name based on a printing condition and a criterion, determines an index data representing the group name to be used as an index of separation for recycling the record medium, and adds the index data to the image data;
a changing unit that changes the criterion based on a command inputted to the print controller.

* * * * *